(12) United States Patent
Netanel

(10) Patent No.: US 7,197,301 B2
(45) Date of Patent: Mar. 27, 2007

(54) METHOD AND APPARATUS FOR SECURE IMMEDIATE WIRELESS ACCESS IN A TELECOMMUNICATIONS NETWORK

(75) Inventor: Eran Netanel, San Mateo, CA (US)

(73) Assignee: Telespree Communications, San Francisco, CA (US)

( * ) Notice: Subject to any disclaimer, the term of this patent is extended or adjusted under 35 U.S.C. 154(b) by 421 days.

(21) Appl. No.: 10/136,712

(22) Filed: Apr. 30, 2002

(65) Prior Publication Data

US 2003/0166398 A1 Sep. 4, 2003

Related U.S. Application Data

(60) Provisional application No. 60/361,816, filed on Mar. 4, 2002.

(51) Int. Cl.
*H04M 3/00* (2006.01)

(52) U.S. Cl. .................. 455/419; 455/410; 455/411; 455/418

(58) Field of Classification Search ............... 455/411, 455/558, 557, 456, 414, 419, 466, 418, 452, 455/527, 524, 410; 709/221, 245, 219, 230, 709/218; 713/200, 169, 2, 171; 705/64
See application file for complete search history.

(56) References Cited

U.S. PATENT DOCUMENTS

| | | | | |
|---|---|---|---|---|
| 6,529,729 | B1* | 3/2003 | Nodoushani et al. | 455/419 |
| 6,671,731 | B1* | 12/2003 | Cain | 709/230 |
| 6,690,930 | B1* | 2/2004 | Dupre | 455/411 |
| 6,725,056 | B1* | 4/2004 | Moles et al. | 455/524 |
| 2002/0147019 | A1* | 10/2002 | Uhlik et al | 455/452 |
| 2002/0174073 | A1* | 11/2002 | Nordman et al. | 705/64 |
| 2003/0027581 | A1* | 2/2003 | Jokinen et al. | 455/456 |
| 2003/0061503 | A1* | 3/2003 | Katz et al. | 713/200 |
| 2003/0101246 | A1* | 5/2003 | Lahti | 709/221 |
| 2003/0114149 | A1* | 6/2003 | Lehtonen et al. | 455/418 |

* cited by examiner

*Primary Examiner*—Duc M. Nguyen
*Assistant Examiner*—Wayne Cai
(74) *Attorney, Agent, or Firm*—Michael A. Glenn; Glenn Patent Group

(57) ABSTRACT

A wireless telephone and messaging system provides Secure Immediate Wireless Access (SIWA) to wireless telephones onto existing wireless networks, such as GSM, CDMA, TDMA, and analog (AMPS). The SIWA protocol uses existing wireless network messaging to exchange information between wireless devices and a network server, referred to herein as an Intelligent Service Manager (ISM). The ISM acts as a gateway between wireless devices and wireless service provider, and provides the wireless devices with an immediate limited or unlimited access to the wireless network. The ISM can also deny access to the wireless network from unauthorized wireless devices.

23 Claims, 12 Drawing Sheets

METHOD AND APPARATUS FOR SECURE IMMEDIATE WIRELESS ACCESS IN A TELECOMMUNICATIONS NETWORK

CROSS-REFERENCE TO RELATED APPLICATIONS

This application claims priority to U.S. Provisional Patent Application No. 60/361,816 filed Mar. 4, 2002 (Attorney Docket NO. MTLK0008PR).

BACKGROUND OF THE INVENTION

1. Technical Field

The invention relates to telecommunications. More particularly, the invention relates to a method and apparatus for secure, immediate, wireless access in a telecommunications network.

2. Description of the Prior Art

Many useful voice and data wireless applications are not cost-effective for carriers to support because the cost of provisioning the network and devices can be greater than the revenue generated from the service. Implementing instant wireless activation and provisioning eliminates the need for call center agents to provide basic device provisioning and activation services, increasing provisioning speed and accuracy. In addition, the technology infrastructure used for instant activation and provisioning inherently supports Wireless Sessions in which network resources are used only on demand.

This allows carriers to support more customers with the same network resources. The cost-savings resulting from instant wireless activation, provisioning and Wireless Sessions can enable carriers to increase operating margins across all markets, and profitably serve lower ARPU and intermittent-use applications such as prepaid wireless phones. This capability is critical to overall carrier competitive success because of the fast market growth and high overall revenue potential for these applications.

In today's markets, wireless operators are facing three key issues: falling ARPU, the need to reduce acquisition costs and the need to reduce the cost of operating and maintaining customers. Operators are spending millions of dollars in device activation and provisioning costs today, a cost believed to be constant and unchangeable.

Furthermore, the potential of wireless applications is expanding to include a wide variety of high-volume, intermittent wire-less use scenarios such as wireless modems, telemetry transmitters, emergency-only devices and wireless handset rentals for business and vacation travelers. While the overall revenue potential for serving this market is enormous, many of these applications could cost more to provision than the carriers would realize in profits. This is true because wireless carriers commonly come from a landline background, and use the call center-based methodology for service provisioning that is traditional for that market.

The call center-based provisioning process requires the customer to use a landline telephone to access an agent in the carrier's call center. The agent collects information such as the customer's location, credit information, equipment description, and services requested. This information is entered manually into a proprietary system, which relays it to the many internal systems required to provision the wireless network for device activation. The agent may also provide verbal device provisioning instructions to the user, who then activates the device manually.

Some of the information provided to the agent during the provisioning process, such as the customer's address, requires basic data entry on the part of the operator. Other elements require action by the agent, such as checking credit history and ensuring that the device the customer wants to activate is certified and has been purchased through appropriate channels.

When customers sign up for extended service contracts with a set monthly fee, the call center-based approach to provisioning, while expensive, is financially viable. Today, a new class of wireless users is emerging that does not ensure fixed monthly revenue. These users want to take advantage of applications in which wireless use may be pre-paid, infrequent, for emergency only, or machine-to-machine.

While the overall revenue potential for serving this emerging high volume, intermittent-use market is enormous, many of these applications cost more to provision than the carriers would realize in profits under the traditional call center-based provisioning scenario. Even though network costs per user are reduced as more customers are added to the network, there is no corresponding economy of scale on the provisioning side. For these users, the traditional approach to provisioning is not necessarily financially viable for carriers.

SUMMARY OF THE INVENTION

The preferred embodiment of the invention comprises a wireless device and messaging system that provides Secure Immediate Wireless Access (SIWA) to wireless device onto existing wireless networks, such as GSM, CDMA, TDMA, and analog (AMPS). The SIWA protocol uses existing wireless network messaging to exchange information between wireless devices and a network server, referred to herein as an Intelligent Service Manager (ISM). The ISM acts as a gateway between wireless devices and wireless service providers, and provides the wireless devices with an immediate limited or unlimited access to the wireless network. The ISM can also deny access to the wireless network from unauthorized wireless devices.

DETAILED DESCRIPTION OF THE INVENTION

Figure 1A:
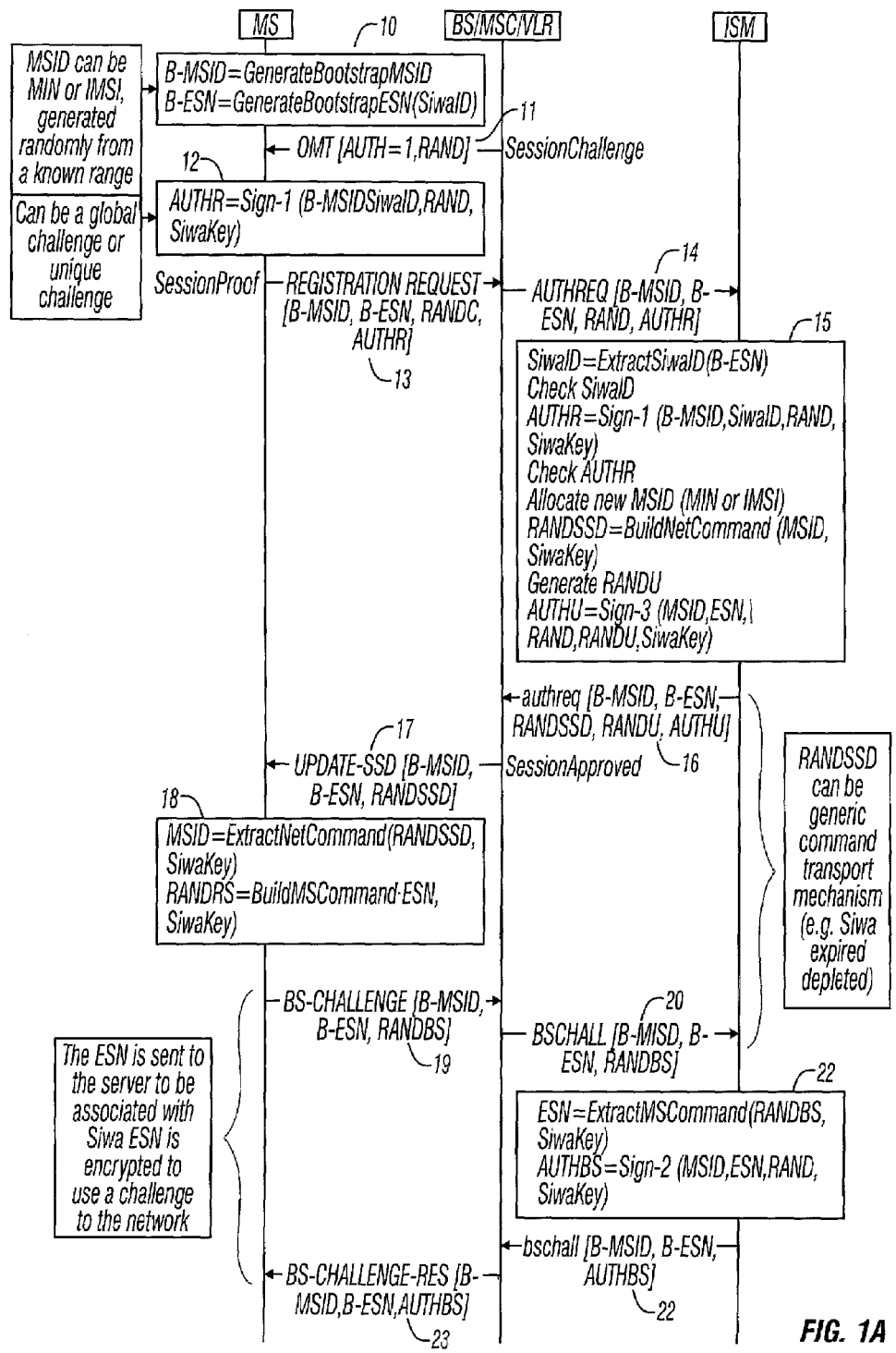
FIGS. 1A and 1B is a flow diagram of a bootstrap process for CDMA/TDMA/analog systems using an SSD update procedure with global challenge according to the invention.

The preferred embodiment of the invention comprises a wireless telephone and messaging system that provides Secure Immediate Wireless Access (SIWA) to wireless telephones onto existing wireless networks, such as GSM, CDMA, TDMA, and analog (AMPS). The SIWA protocol uses existing wireless network messaging to exchange information between wireless devices (MS) and a network server, referred to herein as an Intelligent Service Manager (ISM). The ISM acts as a gateway between wireless devices and wireless service providers, and provides the wireless devices with an immediate limited or unlimited access to the wireless network. The ISM can also deny access to the wireless network from unauthorized wireless devices.

One benefit to wireless service providers is lower operational costs increasing marginal returns associated with subscriber acquisition.

Another benefit to wireless service providers is the market opportunity increases the user base by offering wireless communications for new purposes (e.g. telemetry, telematics) as well as new distribution channels (e.g. convenience stores).

A benefit to wireless users is the easy access to services offered by wireless service provider with no preliminary obligations and instant gratification. Furthermore, wireless devices that are configured to work with multiple service providers allow the user to selectively choose between them.

To service providers, the ISM is a trusted gatekeeper that allows them to provide services with an automated subscriber management and network resource assignment.

In comparison to existing over-the-air activation solutions, the herein disclosed SIWA does not require the implementation of extensions to existing wireless network protocols, nor does it require changes to existing wireless network elements, such as BTS, BSC, MSC, VLR, HLR and/or AC. The invention makes an efficient use of Mobile Station ID (MSID, also known as IMSI in GSM, MIN in TDMA and Analog, and MIN or IMSI in CDMA) by allocating them on a session basis where session can be dynamically defined, e.g. time or capacity limits. Business model logic can also include additional information needed to manage sessions. Such information might include rules on account/session expiration, phone number recycling, phone number multiplexing requirements, and interaction with other network-based applications. For example, a conventional prepaid subscription can be defined as a session that starts when a user purchase its initial airtime and end after no airtime is being purchased for a pre-determined time. A telemetry wireless device (a transmitter) example might define a session that start every time the device registers on the network and end when its transmitted message is sent to destination.

An important benefit of the invention is the efficient assignment of MSDN (also known as MSISDN in GSM or MDN in CDMA/TDMA/Analog) on a per need basis.

For purposes of the discussion herein, the wireless device is identified in the figures by the designation MS, the network elements are identified in the figures by the designation BS/MSC/VLR, and the intelligent service manager is identified in the figures by the designation ISM.

The presently preferred embodiment of SIWA is composed of two major layers:

SIWA Abstraction Layer

This layer concerns Wireless Sessions, which provide a limited or unlimited proof to use a particular service. Such limit could be, for example, time based, usage based, content based, or single use. The Wireless Session is comprised of a <SiwaID, SiwaKey> pair, which uniquely identifies the Wireless Session and proves it is authentic, genuine, and valid. Note that the SiwaID is unique among Wireless Sessions and includes the services with which it is associated. The process of acquiring a Wireless Session is referred to herein as a bootstrap process.

In connection with the preferred embodiment of the invention, the abstraction layer primarily concerns the following Wireless Session Operations:

Operations Associated with Session Purchase at First Network Access

SessionPromote—an operation invoked by ISM to provide the user with an option to purchase a session for a service.

SessionPurchase—an operation invoked by user/device to purchase a session for a service.

SessionGranted—an operation invoked by ISM to provide the user with the <SiwaID, SiwaKey> of a valid session.

SessionDenied—an operation invoked by ISM to provide the user with the reason of the purchase failure.

Operations Associated with Service Access

SessionChallenge—an operation invoked by ISM to ask for the authenticity of a session.

SessionProof—an operation invoked by user/device to provide the ISM with a proof of the session authenticity.

SessionApproved—an operation invoked by ISM to approve the user/device use the session.

SessionExpired—an operation invoked by ISM to deny a session due to service expiration.

SessionDepleted—an operation invoked by ISM to deny session due to service to depletion.

SessionFraudulent—an operation invoked by ISM to deny session due to lack of authenticity.

Operations Associated with Session Information

SessionProvideInfo—an operation invoked by user/device to provide session information such as expiration or usage.

SessionInfo—an operation invoked by ISM to provide the user/device with session information, which could be unsolicited as well.

Adaptation Layer

This layer concerns the actual mapping of the logical operations described into the existing wireless network.

Bootstrap Process

The following is a discussion of a typical bootstrap process according to the invention:

Once the device has been powered on and before the first network access attempt, either registration or call origination, the MS checks for the Wireless Session status. If a non-active Wireless Session status is detected, the MS then changes its state to "Bootstrap Process Initiated". The MS selects a bootstrap network identity and remains in the bootstrap state until a SessionGranted is received. The SessionGranted provides the mobile network identity, that is the assigned Mobile Station ID or MSID. It could also include a new SiwaKey or a derived key, such as an A-Key (e.g. in CDMA/TDMA/Analog). As an enhancement, the SessionGranted returns the bootstrap network identity back to the MS for a limited use, such as one time use or limited time use. This would enable occasional and bursty-data transmitters use the bootstrap network identifier for the duration of the data transmission, therefore conserve network identifiers.

Once provided by the ISM, the newly assigned network identity is programmed into the MS and the MS is required to re-initiate its network access using its new identity.: In addition, the ISM can decide to invalidate the provided Wireless Session as a result of an expiration or usage depletion. The MS preferably always checks the Wireless Session status before re-initiating its network access.

The MS selects an MSID for use during the bootstrap process. This MSID is allocated from a plurality of bootstrap MSIDs known to the network. Different bootstrap MSID selection algorithm could apply using different allocation schemes, for example using carrier or national or global specific pools, location sensitive pools, etc. In the case of an MSID collision between two bootstrapping devices, either one of the colliding devices can be rejected from the network, i.e. an authentication failure. Once detected, the MS is required to initiate a new bootstrap process.

Optionally, the MS, once powered on and after scanning the available networks, interacts with the user to select the desired service provider. The MS then selects a bootstrap MSID known by the selected network.

Optionally, the bootstrap process can include a session purchase phase, where the user is acknowledged with a session promotion that could be purchased from the MS itself after certain user information is collected. In this case, the ISM sends a SessionPromote message to the MS. The MS returns a SessionPurchase message with the user information included, and a SessionGranted acknowledges the purchase in case of a successful purchase or a SessionDenied indicates a failure. The purchase phase can use any circuit and non-circuit data transport layer (e.g. SMS, USSD, GPRS, UMTS, CDMA, cdmaOnce and cdma2000) for message exchange between ISM and the MS. It can also be encapsulated in higher Likewise; in case the session was pre-purchased the bootstrap process can include a NULL session purchase phase, in which no SessionPromote or SessionPurchase messages are exchanged.

Figure 1B:
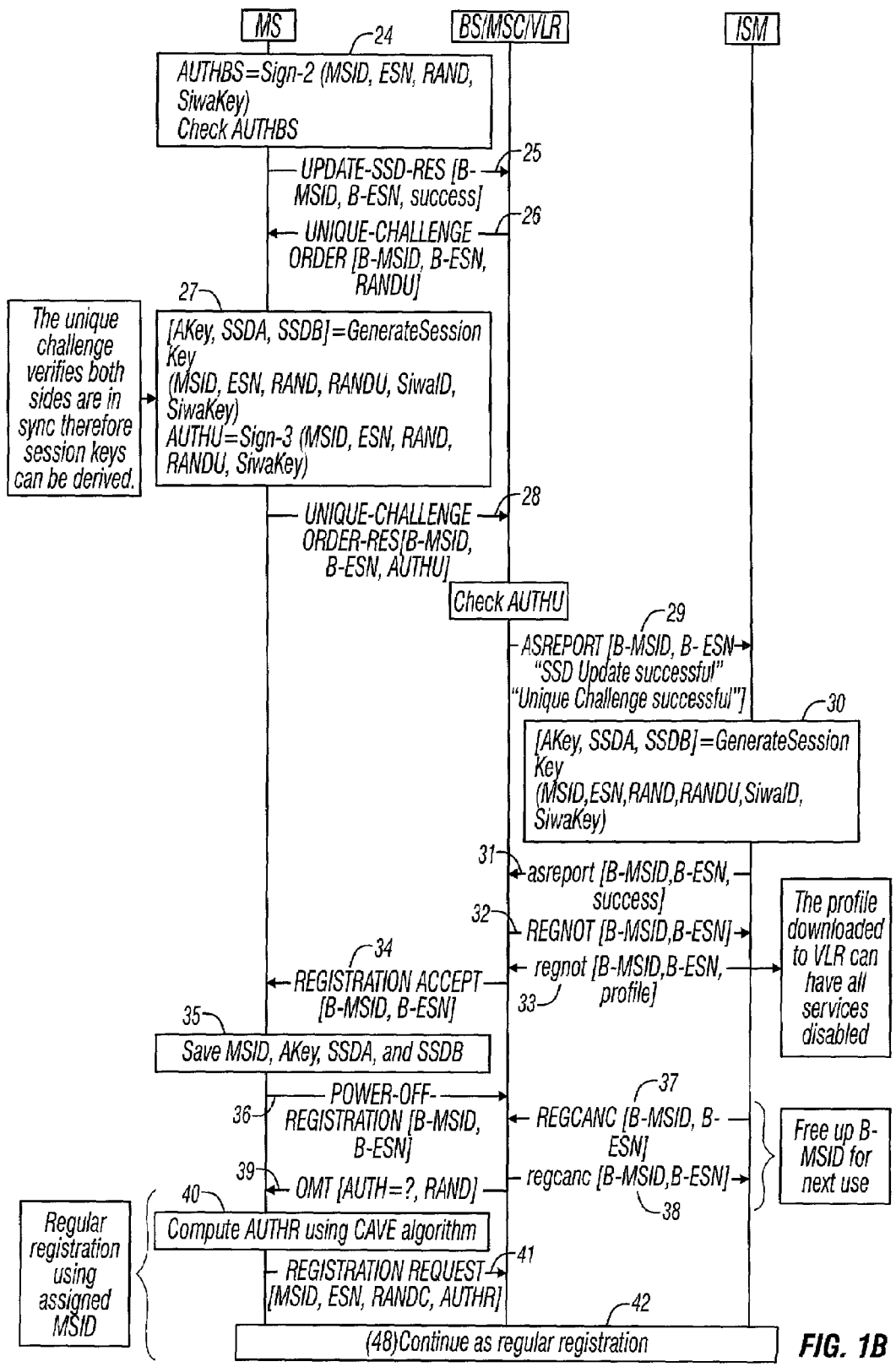

FIGS. 1A and 1B are a flow diagram of a bootstrap process for CDMA/TDMA/analog systems using an SSD update procedure and global challenge according to the invention. With regard to FIG. 1, the bootstrap process begins by generating a general bootstrap MSID, which allows the wireless device MS to access the network. The wireless device includes a proof of the SiwaID signed by SiwaKey and the global challenge when registering onto the network. The BS/MSC/VLR forward an authentication request to the Intelligent Service Manager ISM. The ISM responds by initiating an SSD Update process via the network to the wireless device in which the device and ISM exchange additional access information. A unique challenge is used to verify that both sides of the communication, i.e. the wireless device and the ISM are in sync such that session keys between the pair can be derived. A profile is then downloaded to BS/MSC/VLR the network to complete the bootstrap registration process. At this point, the wireless device re-initiates a registration process using its new assigned network ID.

Figure 2A:
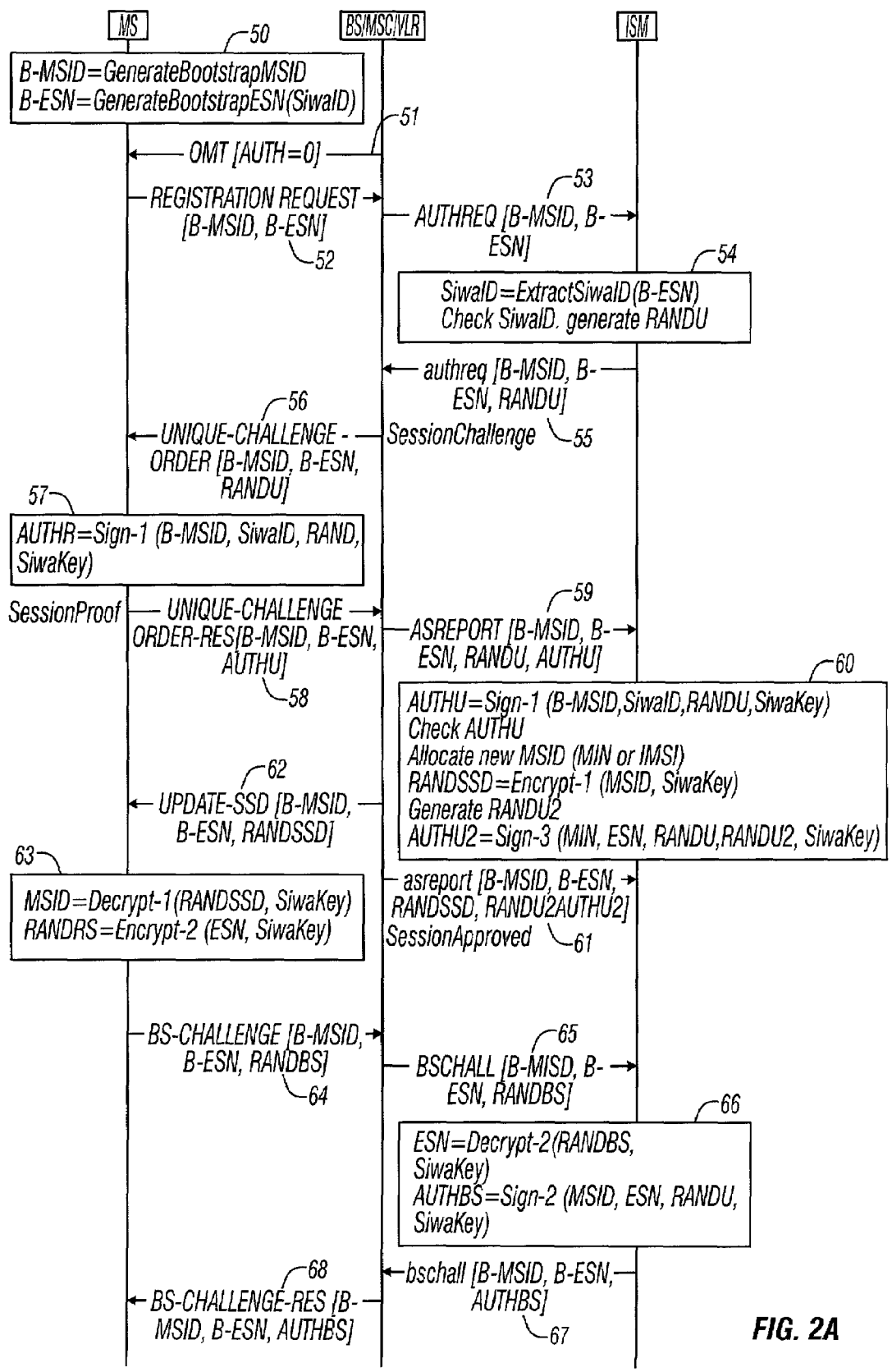
FIGS. 2A and 2B is a flow diagram of a bootstrap process for CDMA/TDMA/analog systems using an SSD update procedure with unique challenge according to the invention.
Figure 2B:
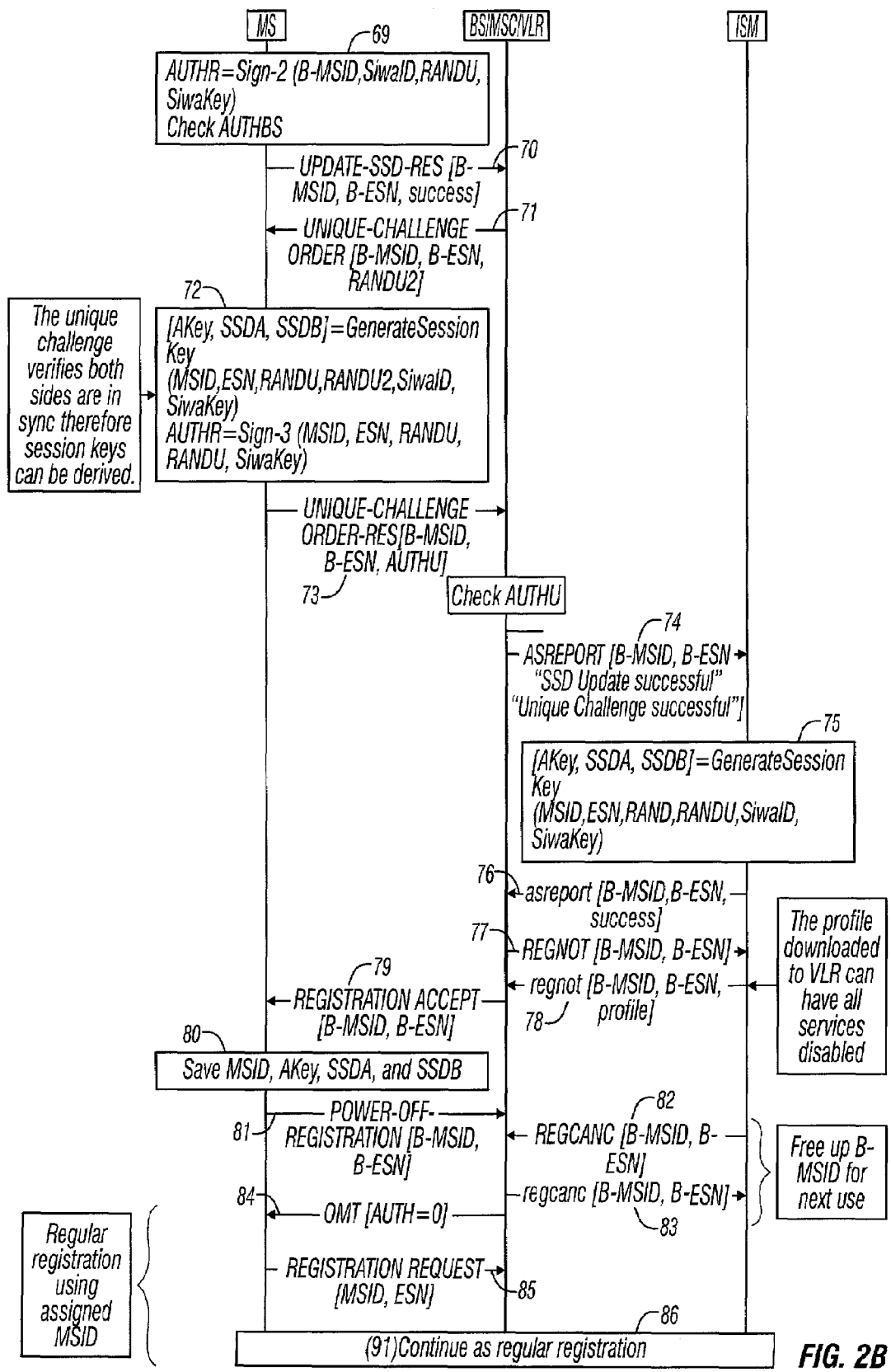

FIGS. 2A and 2B are a flow diagram of a bootstrap process for CDMA/TDMA/analog systems using an SSD update procedure with unique challenge according to the invention. With regard to FIG. 2, the bootstrap process begins by generating a general bootstrap MSID, which allows the wireless device MS to access the network. The BS/MSC/VLR retrieve unique challenge parameters from ISM and explicitly challenge the wireless device that respond with a proof of the SiwaID signed by SiwaKey. The BS/MSC/VLR forward an authentication response to the ISM. The ISM responds by initiating an SSD Update process via the network to the wireless device in which the device and ISM exchange additional access information. An additional unique challenge is used to verify that both sides of the communication, i.e. the wireless device and the ISM are in sync such that session keys between the pair can be derived. A profile is then downloaded to BS/MSC/VLR the network to complete the bootstrap registration process. At this point, the wireless device re-initiates a registration process using its new assigned network ID.

Figure 3A:
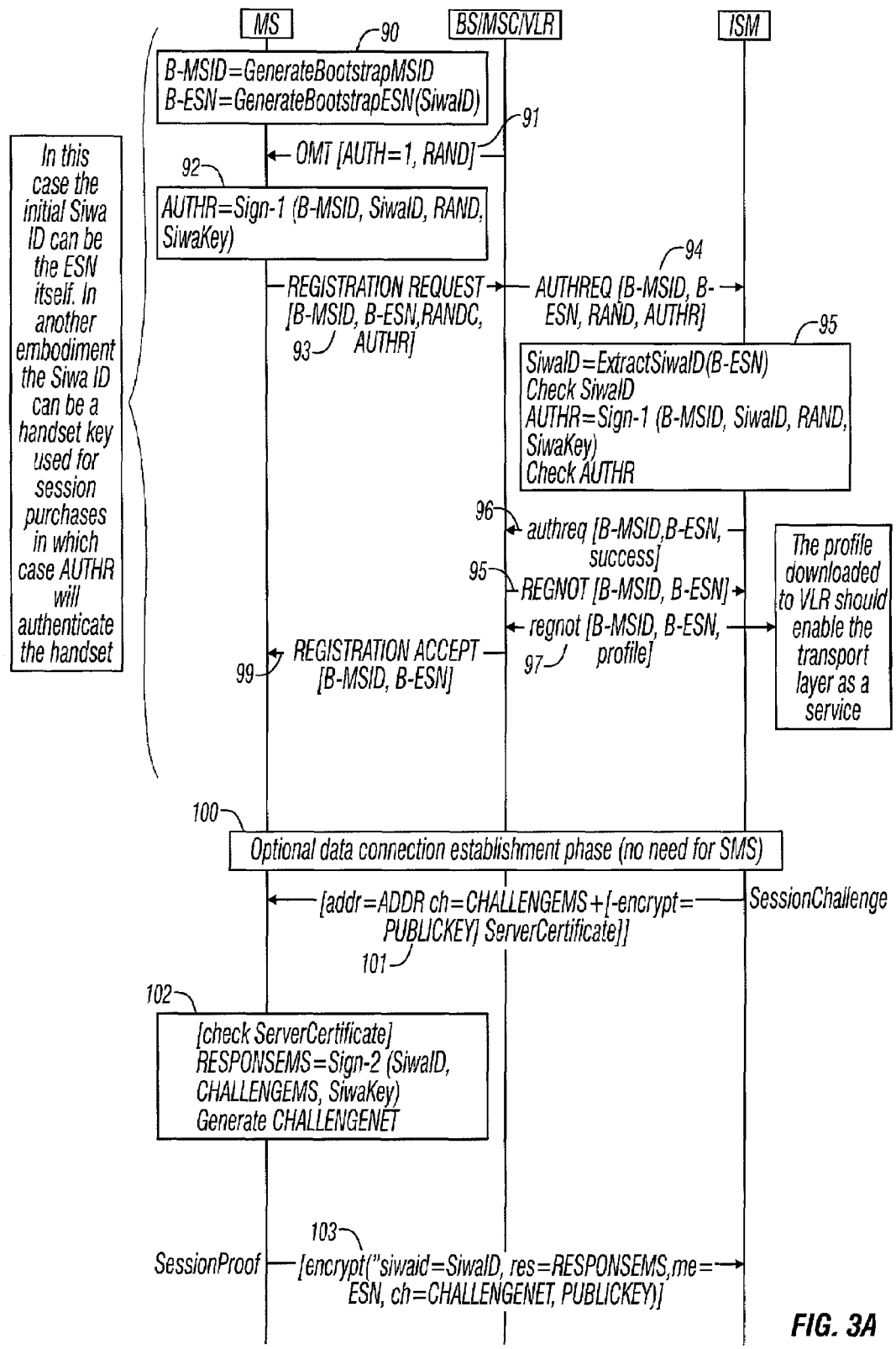
FIGS. 3A and 3B is a flow diagram of a bootstrap process for CDMA/TDMA/analog systems using a data transport bearer according to the invention.
Figure 3B:
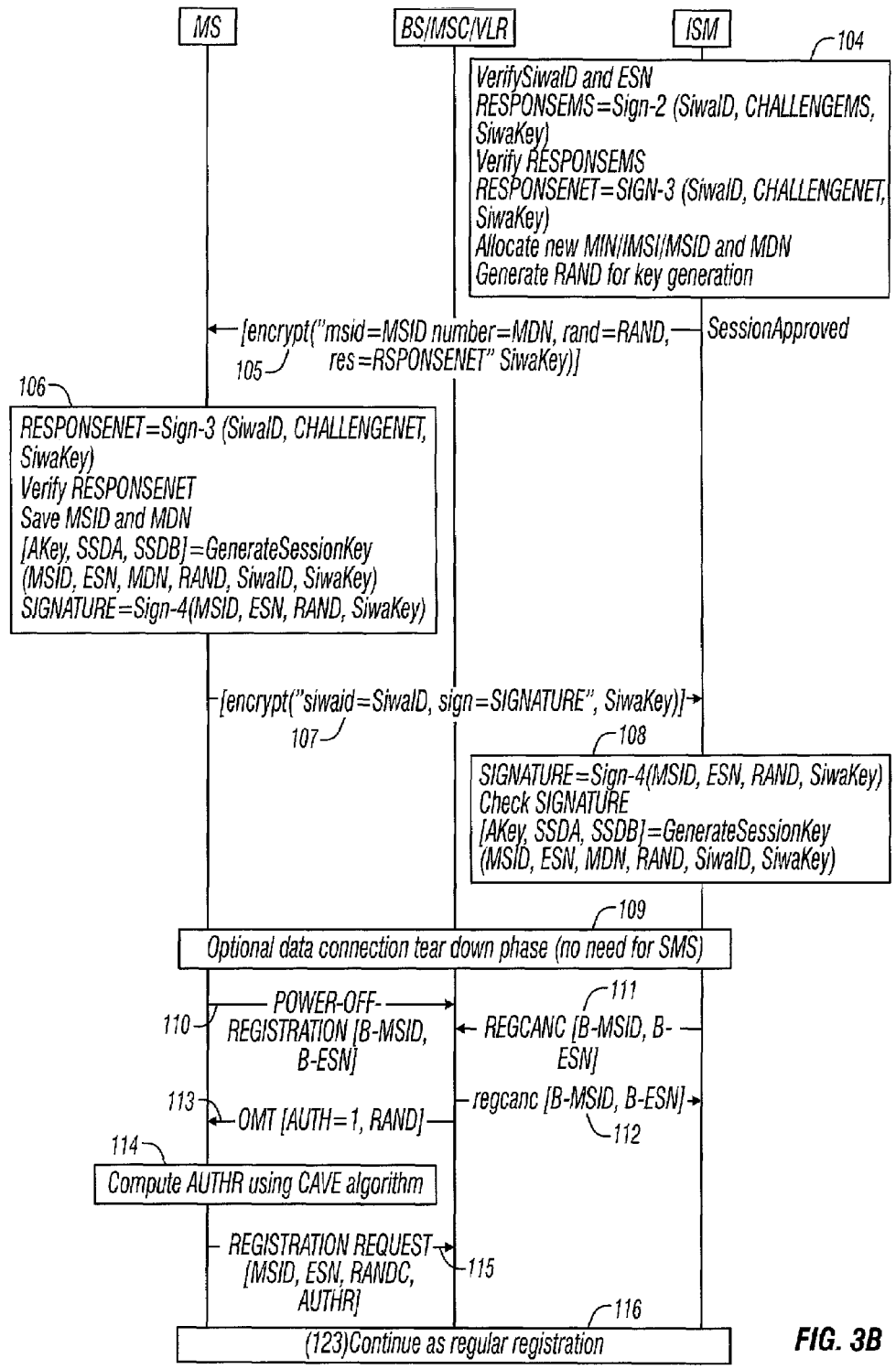

FIGS. 3A and 3B are a flow diagram of a bootstrap process for CDMA/TDMA/analog systems using a data transport bearer according to the invention. In FIG. 3, the bootstrap process proceeds as with the discussion in connection with FIG. 1 above. However, in this case, the initial identification of the MS can be the electronic serial number ESN signed by handset's manufacturer key. The ISM downloads a profile to the network that enables the transport layer as a service. Thereafter a data connection is established, if required. The data connection could be triggered either by ISM or by the MS. Alternatively, ISM can initiate additional SSD Update process as in FIG. 1 above where the RANDSSD contains a specific command instructing the MS to initiate a data connection to purchase a session. ISM and wireless device mutually authenticate each other and ISM assigns new network ID. An additional signature exchange is used to verify that both sides of the communication, i.e. the wireless device and the ISM are in sync such that session keys between the pair can be derived. At this point, the wireless device re-initiates a registration process using its new assigned network ID.

Figure 4A:
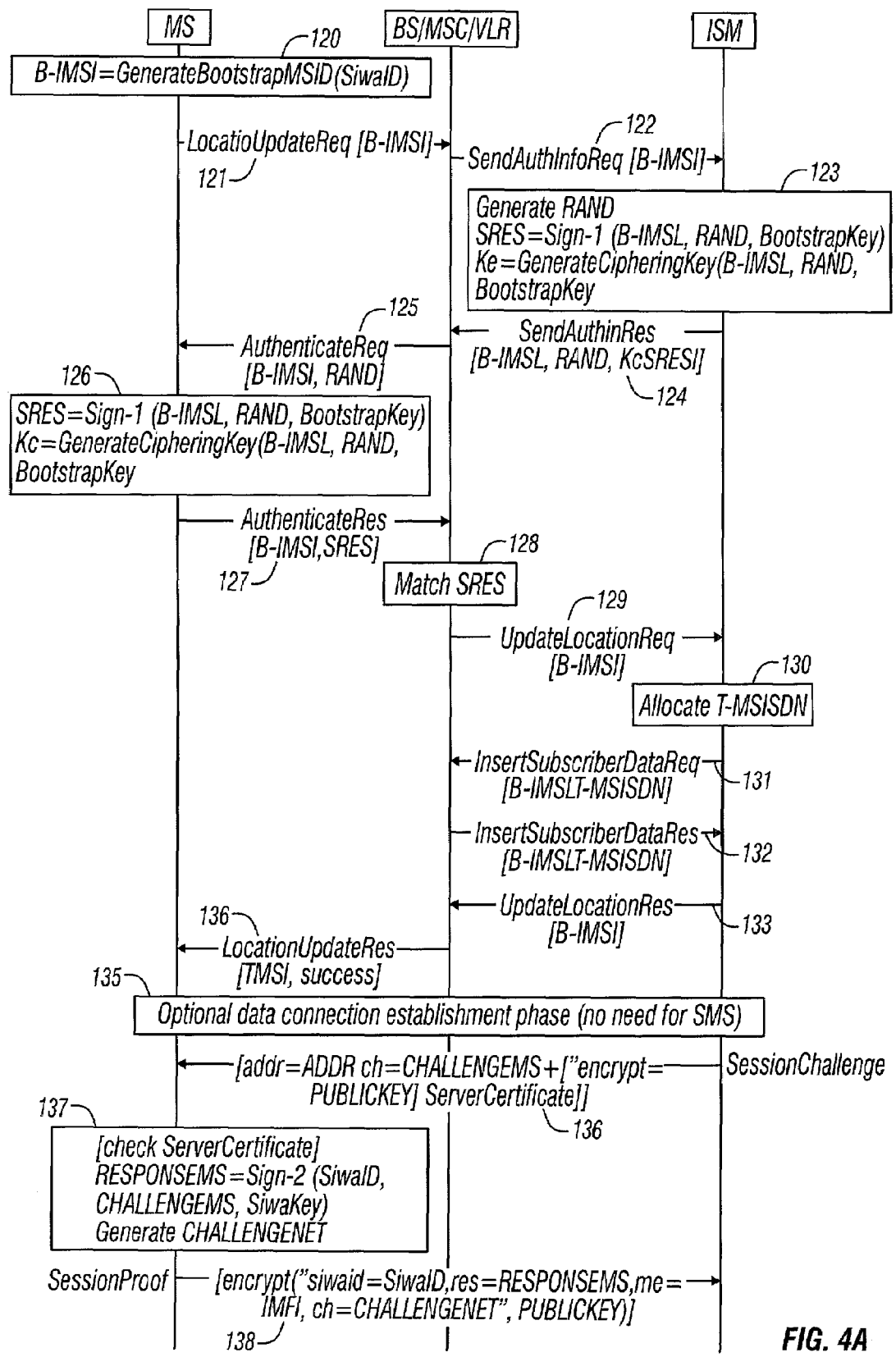
FIGS. 4A and 4B is a flow diagram of a bootstrap process for GSM systems using a data transport bearer according to the invention.
Figure 4B:
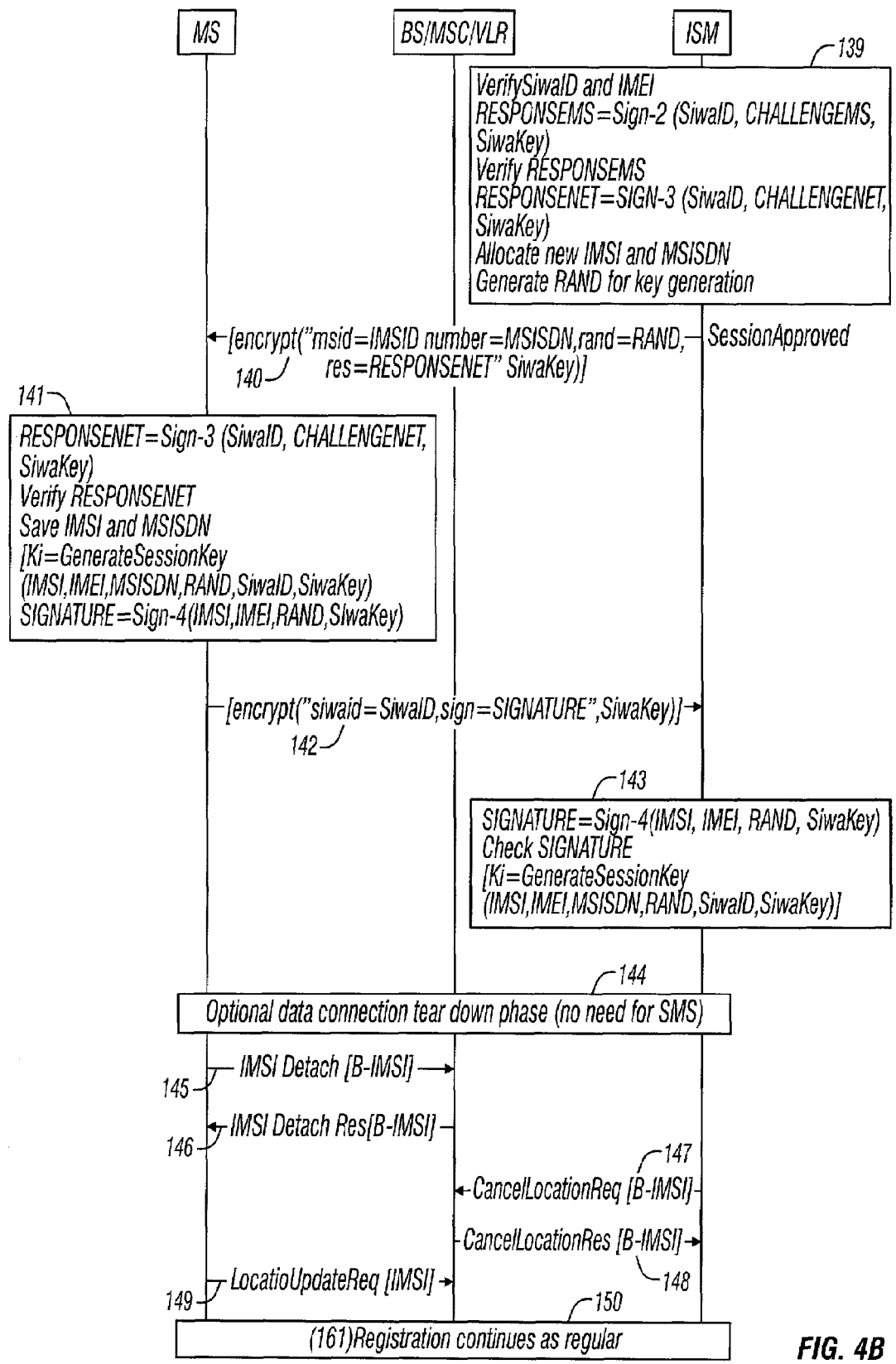

FIGS. 4A and 4B are a flow diagram of a bootstrap process for GSM systems using a data transport bearer according to the invention. In FIG. 4, the data transport layer can be SMS, GPRS, EDGE, UMTS, or a data call using a circuit switch. The data connection may be set-up by the network, or by the wireless device. In the case of SMS, there is no need for a set-up. Further, the system can add a message signature for message integrity. The authentication encryption may include standard cryptographic techniques such as x.509, anonymous RSA, Diffie-Hellman (WTLS) or IKE. Message sequence numbers may also be used to avoid message duplications.

Figure 5A:
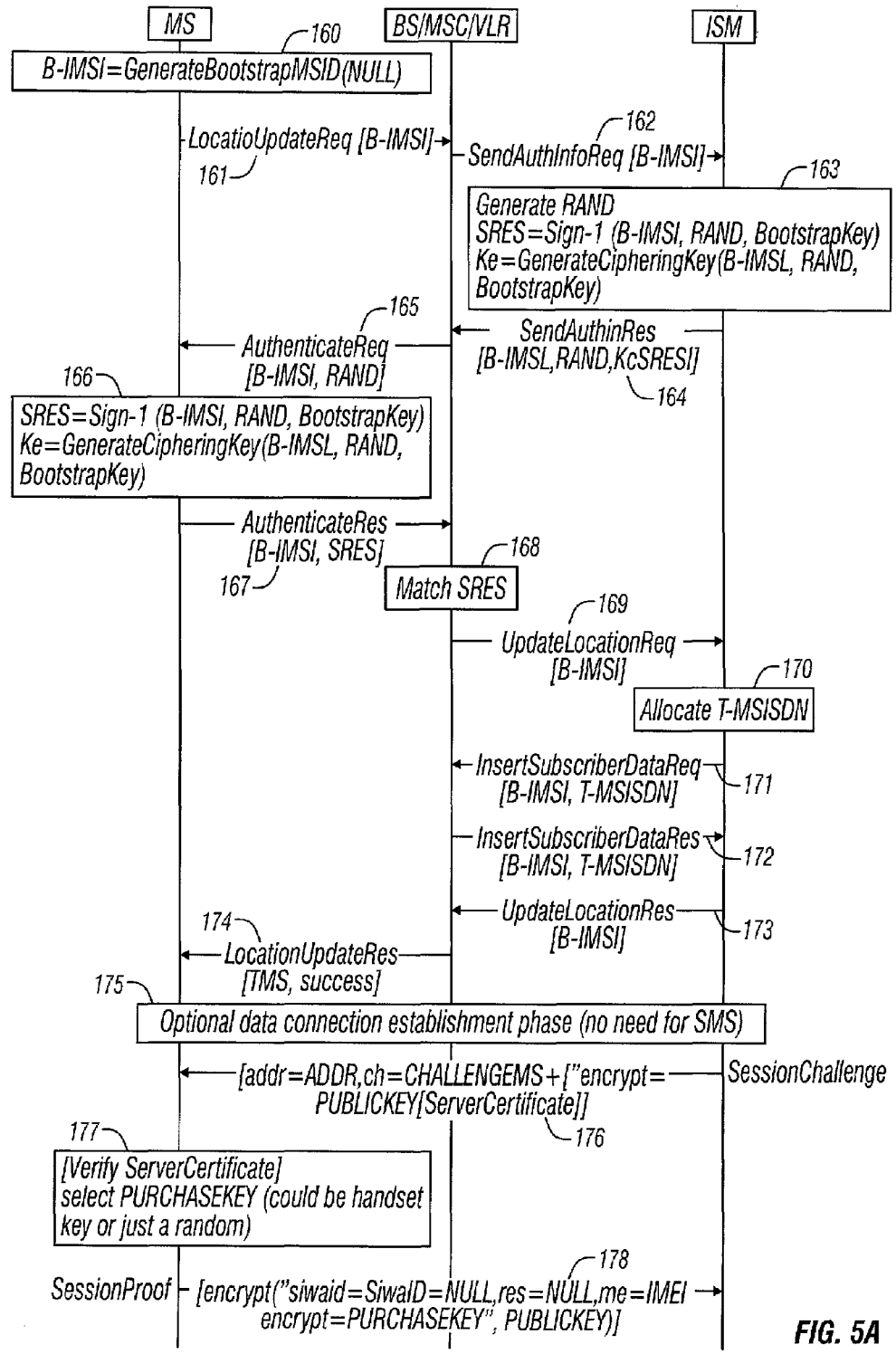
FIGS. 5A and 5B is a flow diagram of a bootstrap process for GSM systems using a data transport bearer and session purchase according to the invention.
Figure 5B:
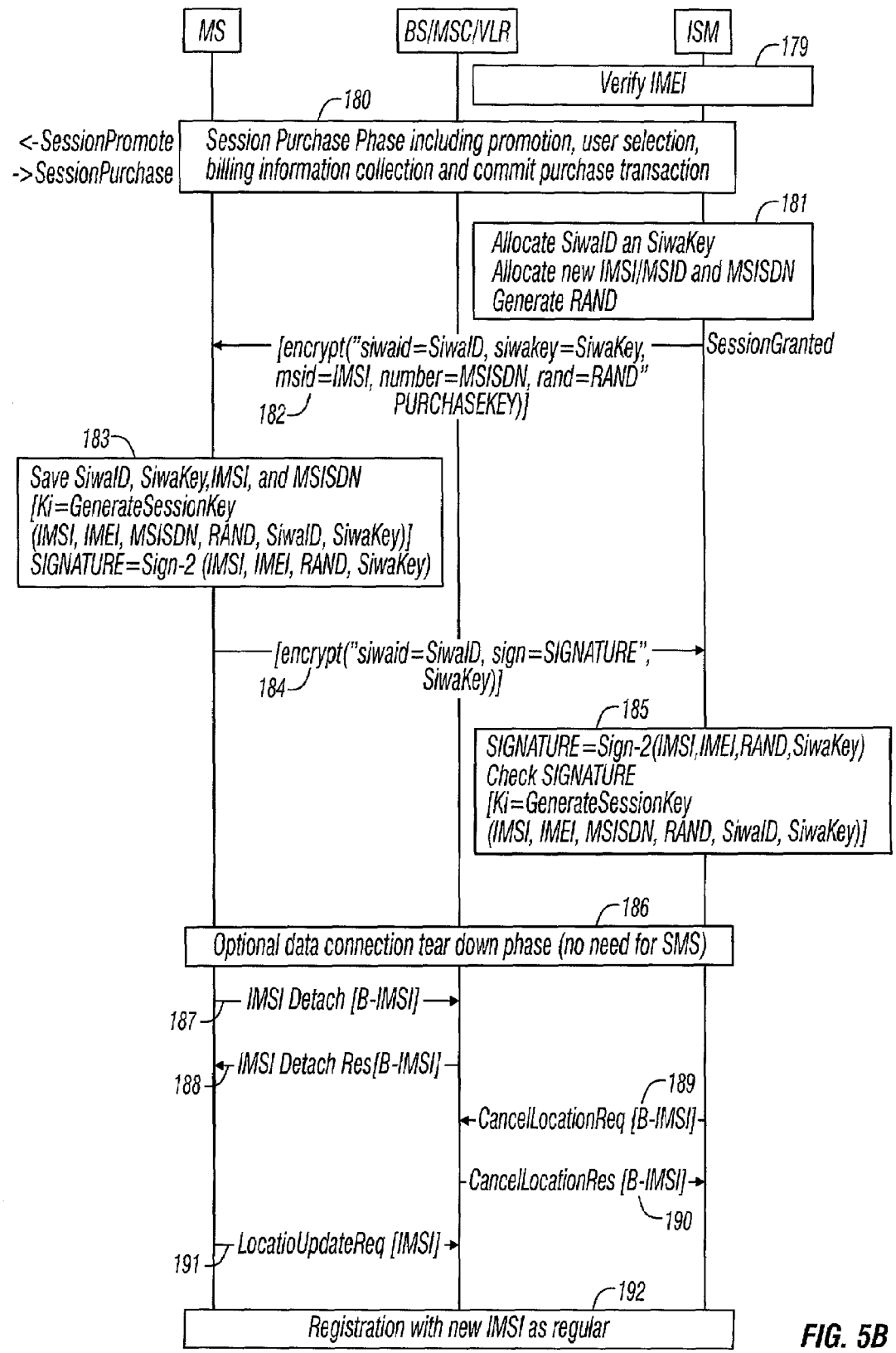

FIGS. 5A and 5B are a flow diagram of a bootstrap process for GSM systems using a data transport bearer and session purchase according to the invention. In connection with FIG. 5, it should be noted that the session purchase phase may include a promotion of several sessions each offers different service and payment methods where the purchase command preferable includes the chosen service and payment.

Figure 6A:
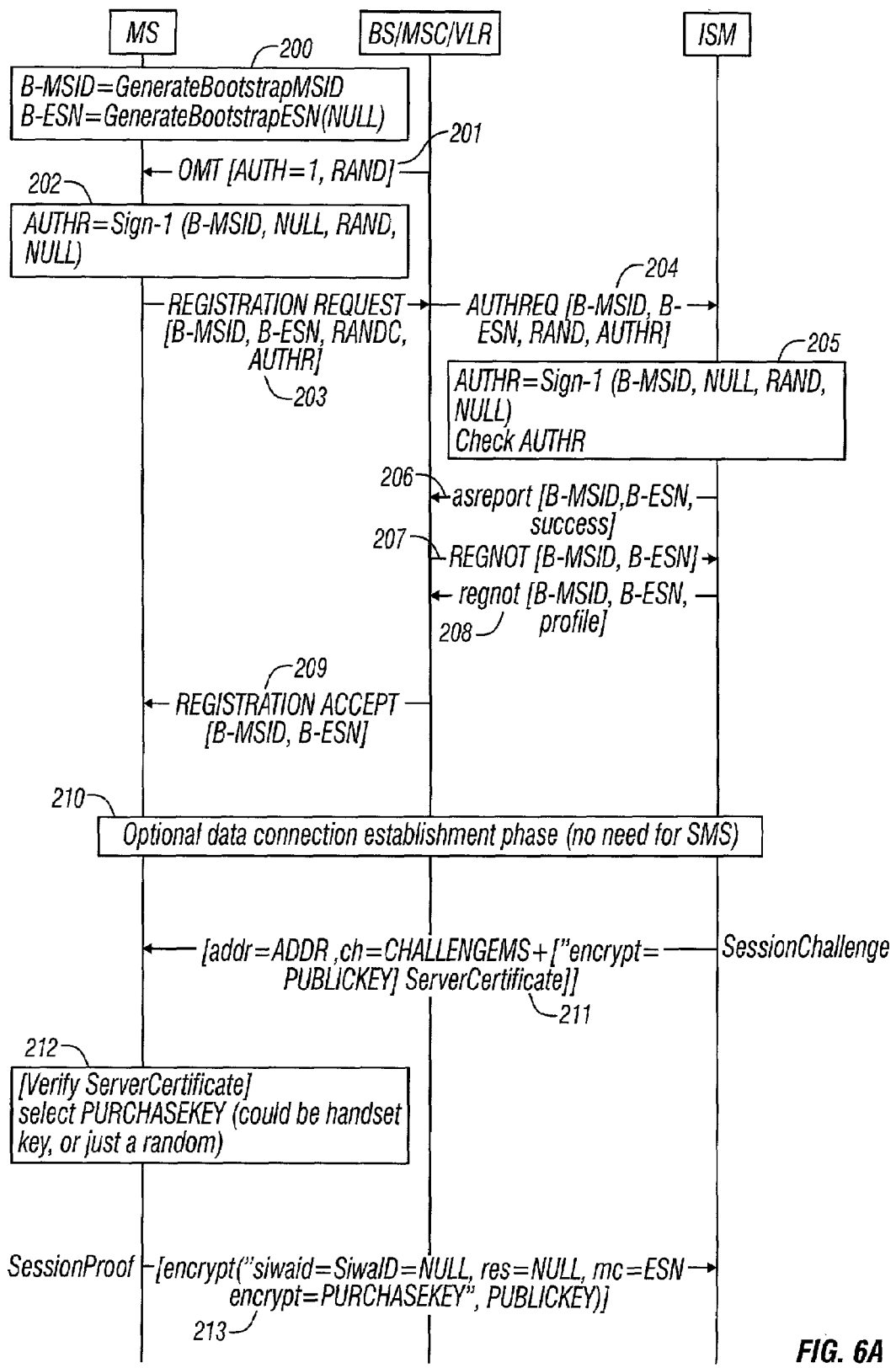
FIGS. 6A and 6B is a flow diagram of a bootstrap process for GSM systems using a data transport bearer and session purchase according to the invention.
Figure 6B:
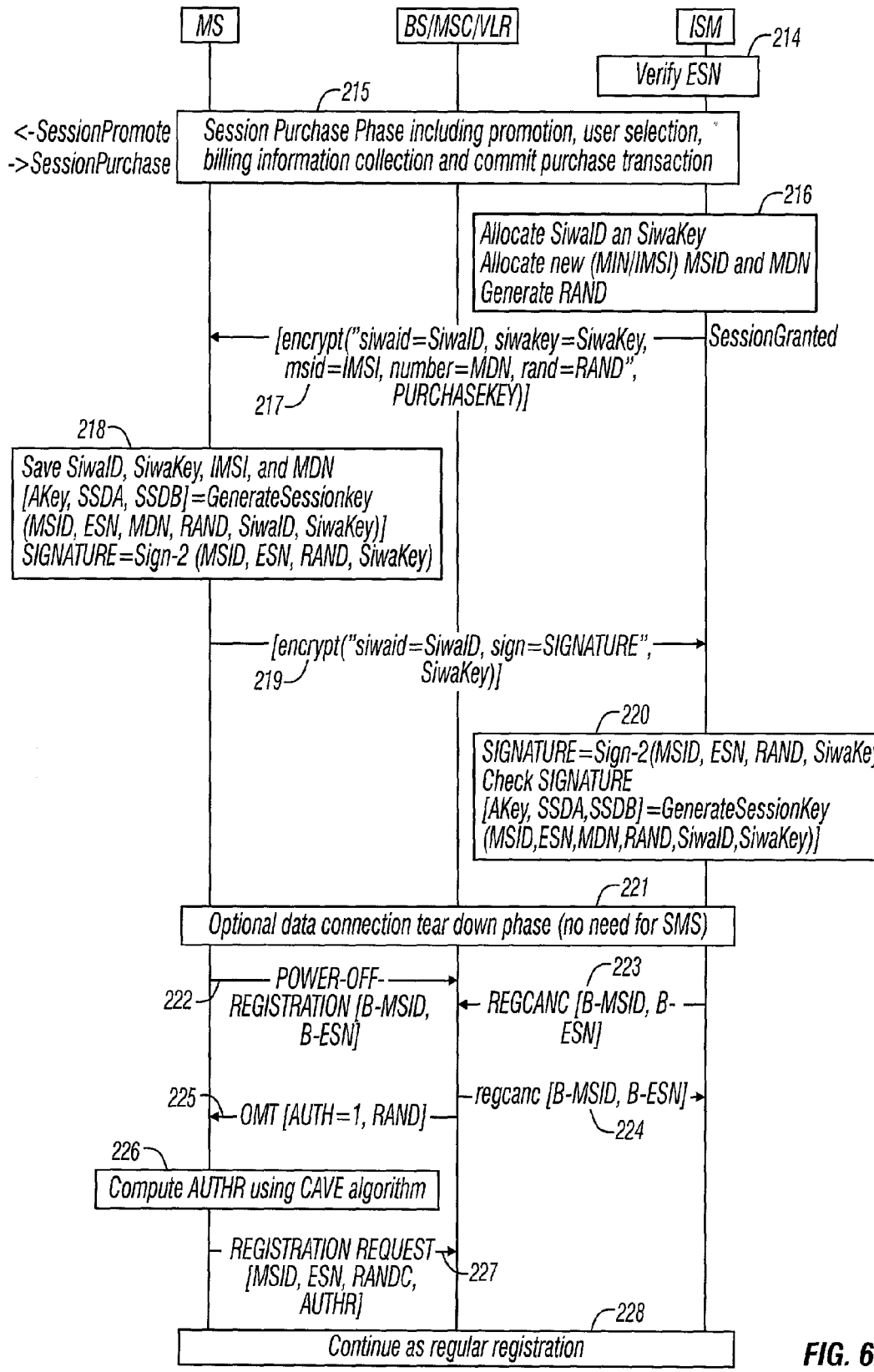

FIGS. 6A and 6B are a flow diagram of a bootstrap process for CDMA/TDMA/analog systems using a data transport bearer and session purchase according to the invention. In connection with FIG. 6, it should be noted that the initial authentication at the first network access could authenticate the ESN and a manufacturer key thereby certifying the device.

FIGS. 1–6 are now discussed in greater detail with regard to the actual exchange of information between the wireless device MS, the network, BS/MS/VLR, and the intelligent service manager ISM.

In FIG. 1, the MS generate a B-MSID=GenerateBootstrapMSID B-ESN=GenerateBootstrapESN(SiwaID) 10. The BS/MSC/VLR, initiate a global challenge with an OMT [AUTH=1, RAND] 11. The MS generates a AUTHR=Sign-1 (B-MSID, SiwaID, RAND, SiwaKey) 12 and sends a REGISTRATION REQUEST [B-MSID, B-ESN, AUTHR] 13 which is forwarded via the network to the ISM using AUTHREQ [B-MSID, B-ESN, RAND, AUTHR] 13. The ISM extracts SiwaID from the B-ESN using SiwaID=ExtractSiwaID(B-ESN) 15, it then checks SiwaID in its database and verifies AUTHR=sign-1 (B-MSID, SiwaID, RAND, SiwaKey) 15. ISM then, allocates new MSID (MIN or IMSI) 15 and embed it in RANDSSD=BuildNetCommand (MSID, SiwaKey) 15. ISM generates RANDU and computes AUTHU=sign-3 (MSID, ESN, RAND, RANDU, SiwaKey) 15 and sends an authreq [B-MSID, B-ESN, RANDSSD, RANDU, AUTHU] 16 via the network, which is forwarded as UPDATE-SSD [B-MSID, B-ESN, RANDSSD] 17 to the wireless device. The MS extracts the new MSID from RANDSSD using MSID=ExtractNetCommand (RANDSSD, SiwaKey) 18. It will then embed the real ESN into RANDBS using RANDBS=BuildMSCommand (ESN, SiwaKey) and send it to the network using BS-CHALLENGE [B-MSID, B-ESN, RANDBS] 19 message which is forwarded as BSCHALL [B-MISD, B-ESN, RANDBS] 20 to the ISM. ISM extract the ESN using ESN=ExtractMSCommand (RANDBS, SiwaKey) 21, generate a signature AUTHBS=sign-2 (MSID, ESN, RAND, SiwaKey) 21 is and a respond with bschall [B-MSID, B-ESN, AUTHBS] 22, which is forwarded by the network to the MS as BS-CHALLENGE-RES [B-MSID, B-ESN, AUTHBS] 23. The MS generate a similar signature AUTHBS=Sign-2 (MSID, ESN, RAND, SiwaKey) 24 and check both AUTHBS match. It then, sends an UPDATE-SSD-RES [B-MSID, B-ESN, success] 25 to the network, which then issues a unique challenge using UNIQUE-CHALLENGE-ORDER [B-MSID, B-ESN, RANDU] 26 to the MS. The MS derives new a session keys using [AKey,SSDA,SSDB]=GenerateSessionKey (MSID, ESN, RAND, RANDU, SiwaID, SiwaKey)27, a signature AUTHU using AUTHU=Sign-3 (MSID, ESN, RAND, RANDU, SiwaKey) 27 and sends UNIQUE-CHALLENGE-ORDER-RES [B-MSID, B-ESN, AUTHU] 28 to the network which then matched by the network and an authentication report ASREPORT [B-MSID, B-ESN, "SSD Update Successful", "Unique Challenge Successful"] 29 is sent to the ISM. ISM then, derive session keys using [A Key, SSDA, SSDB]=GenerateSessionKey (MSID, ESN, RAND, RANDU, SiwaID, SiwaKey) 30 and respond with asreport [B-MSID, B-ESN, success] 10 to the network. The VLR then forward the registration request using REGNOT [B-MSID, B-ESN] 32 to ISM who download the service profile to VLR with a regnot [B-MSID, B-ESN, profile] 33 which is then forwarded as REGISTRATION ACCEPT [B-MSID, B-ESN] 34 to the MS. The MS saves the appropriate information Save MSID, Akey, SSDA and SSDB 35 and is then deregister itself from the network using POWER-OFF-REGISTRATION [B-MSID, B-ESN] 36. The ISM cancels the registration with REGCANC [B-MSID, B-ESN] 37 and receives acknowledgement from the network with regcanc [B-MSID, B-ESN] 38 so other MSs may use B-MSID. The BS/MSC/VLR, initiate a global challenge with an OMT [AUTH=1, RAND] 39 to the MS which computes the authorization, in this case using a CAVE algorithm Compute AUTHR using AUTHR=CAVE (MSID, ESN, SSDA, SSDB) 40 and sends a REGISTRATION REQUEST [MSID, ESN, RANDC, AUTHR] 41 to the network at this point registration continues as a regular registration 42.

In FIG. 2, the MS generate a B-MSID=GenerateBootstrapMSID B-ESN=GenerateBootstrapESN(SiwaID) 50. It, initiates a REGISTRATION REQUEST [B-MSID, B-ESN] 52 to BS/MSC/VLR. The BS/MSC/VLR send an AUTHREQ [B-MSID, B-ESN] 53 to ISM in order to authenticate the MS. The ISM extracts SiwaID from the B-ESN using SiwaID=ExtractSiwaID(B-ESN) 54, it then checks SiwaID in its database and generate an RANDU 54 to challenge the MS. ISM then, sends authreq [B-MSID, B-ESN, RANDU] 55 to BS/MSC/VLR. BS/MSC/VLR send UNIQUE CHALLENGE [B-MSID, B-ESN, RANDU] 56 to the MS. The MS generates an AUTHU=sign-1 (B-MSID, SiwaID, RANDU, SiwaKey) 57 and sends a UNIQUE CHALLENGE RESPONSE [B-MSID, B-ESN, AUTHU] 58 which is forwarded via the network to the ISM using ASREPORT [B-MSID, B-ESN, RANDU, AUTHU] 59. ISM verifies AUTHU=sign-1 (B-MSID, SiwaID, RANDU, SiwaKey) 60 matches the one received from the MS. It then, allocates new MSID (MIN or IMSI) 60 and embed it in RANDSSD=BuildNetCommand (MSID, SiwaKey) 60. ISM generates RANDU2 and computes AUTHU2=sign-3 (MSID, ESN, RANDU, RANDU2, SiwaKey) 60. It sends an asreport [B-MSID, B-ESN, RANDSSD, RANDU2, AUTHU2 ] 61 via the network, which is forwarded as UPDATE-SSD [B-MSID, B-ESN, RANDSSD] 62 to the MS. The MS extracts the new MSID from RANDSSD using MSID=ExtractNetCommand (RANDSSD, SiwaKey) 63. It will then embed the real ESN into RANDBS using RANDBS=BuildMSCommand (ESN, SiwaKey) 63 and send it to the network using BS-CHALLENGE [B-MSID, B-ESN, RANDBS] 64, which is forwarded as BSCHALL [B-MISD, B-ESN, RANDBS] 65 to the ISM. ISM extract the ESN using ESN=ExtractMSCommand (RANDBS, SiwaKey) 66, generate a signature AUTHBS=sign-2 (MSID, ESN, RAND, SiwaKey) 66 and respond with bschall [B-MSID, B-ESN, AUTHBS] 67, which is forwarded by the network to the MS as BS-CHALLENGE-RES [B-MSID, B-ESN, AUTHBS] 68. The MS generate a similar signature AUTHBS=sign-2 (MSID, ESN, RANDU, SiwaKey) 69 and check both AUTHBS match. It then, sends an UPDATE-SSD-RES [B-MSID, B-ESN, success] 70 to the network. The BS/MSC/VLR issues a unique challenge using UNIQUE-CHALLENGE-ORDER [B-MSID, B-ESN, RANDU2] 71 to the MS. The MS derives new a session keys using [AKey,SSDA,SSDB]=GenerateSessionKey (MSID, ESN, RANDU, RANDU2, SiwaID, SiwaKey) 72, a signature AUTHU2 using AUTHU2=sign-3 (MSID, ESN, RANDU, RANDU2, SiwaKey) 72 and issues a unique challenge response using UNIQUE-CHALLENGE-ORDER-RES [B-MSID, B-ESN, AUTHU2] 73 to the network which then matched by the network and an authentication report ASREPORT [B-MSID, B-ESN, "SSD Update Successful", "Unique Challenge Successful"] 74 is sent to the ISM. ISM then, derive session keys using [A Key,SSDA, SSDB]=GenerateSessionKey (MSID, ESN, RANDU, RANDU2, SiwaID, SiwaKey) 75 and respond with asreport [B-MSID, B-ESN, success] 76 to the network. The VLR then forward the registration request REGNOT [B-MSID, B-ESN] 77 to ISM who download the service profile to VLR with a regnot [B-MSID, B-ESN, profile] 78, which is then forwarded as REGISTRATION ACCEPT [B-MSID, B-ESN] 79 to the MS. The MS saves the appropriate information Save MSID, Akey, SSDA and SSDB 80 and is then deregister itself from the network using POWER-OFF-REGISTRATION [B-MSID, B-ESN] 81. The ISM cancels the registration with REGCANC [B-MSID, B-ESN] 82 and receives acknowledgement from the network with regcanc [B-MSID, B-ESN] 83 so other MSs may use B-MSID. The MS then sends REGISTRATION REQUEST [MSID, ESN] 84 to the network at this point registration continues as a regular registration.

In FIG. 3, bootstrap information is generated at the MS using B-MSID=GenerateBootstrapMSID B-ESN= GenerateBootstrapESN (SiwaID) 90 and the network responds OMT [AUTH=1, RAND] 91. The MS computes AUTHR=sign-1 (B-MSID, SiwaID, RAND, SiwaKey) 92 and sends a REGISTRATION REQUEST [B-MSID, B-ESN, RANDC, AUTHR] 93 which is forwarded by the network to the ISM with AUTHREQ [B-MSID, B-ESN, RAND, AUTHR] 94. The ISM extracts SiwaID using SiwaID=ExtractSiwaID(B-ESN) 95 and check SiwaID in its database. It computes and checks AUTHR=sign-1 (B-MSID, SiwaID, RAND, SiwaKey) 95 and sends authreq [B-MSID, B-ESN, success] 96 to BS/MSC/VLR. BS/MSC/VLR then, respond with REGNOT [B-MSID, B-ESN] 97 to the MS. ISM downloads the MS profile information with regnot [B-MSID, B-ESN, profile] 98 and REGISTRATION ACCEPT [B-MSID, B-ESN] 99 is forwarded to the MS. At this point, an optional data connection establishment phase 100, either network originated or MS originated, may be executed. For SMS such a connection establishment is not required. ISM sends a message to MS including its own address, an authentication challenge and optionally include a PUBLIC KEY for encryption and ServerCertificate for ISM authentication using [addr=ADDR, ch=CHALLENGEMS+[encrypt=PUBLICKEY| ServerCertificate]] 101. MS may optionally check the ServerCertificate, compute a response using RESPONSEMS=sign-2 (SiwaID, CHALLENGEMS, SiwaKey) 102. Optionally, the MS may generate a network challenge to authenticate ISM. The MS may choose to encrypt the message sent to ISM with ISM PUBLICKEY. It then, sends the message using [encrypt(siwaid=SiwaID,res=RESPONSEMS,me=ESN, ch=CHALLENGENET, PUBLICKEY)] 103. The ISM verifies SiwaID, verifies ESN and checks RESPONSEMS using RESPONSEMS=sign-2 (SiwaID, CHALLENGEMS, SiwaKey) 104. It generates a network signature RESPONSENET using RESPONSENET=sign-3 (SiwaID, CHALLENGENET, SiwaKey) 104. It then allocates new, MSID (MIN or IMSI) and MDN 104. It generates a RAND 104 used to derive session keys and sends a message to MS using [encrypt(msid=MSID,number=MDN,rand=RAND, res=RESPONSENET,SiwaKey)] 105. The MS verifies RESPONSENET=sign-2 (SiwaID, CHALLENGENET, SiwaKey) 106, saves MSID and MDN and derives session keys using [A Key, SSDA, SSDB]=GenerateSessionKey (MSID, ESN, MDN, RAND, SiwaID SiwaKey) 106. It computes a SIGNATURE=Sign-4 (MSID,ESN,RAND,SiwaKey) 106 and sends a message to ISM [encrypt(siwaid=SiwaID,sign=SIGNATURE, SiwaKey)] 107. The ISM checks SIGNATURE=Sign-4 (MSID, ESN, RAND, SiwaKey) 108 and derive session keys [Akey,SSDA,SSDB] =GenerateSessionKey (MSID,ESN,MDN,RAND,SiwaID, SiwaKey) 108. At this time, if a data connection has been previously established it may be torn down 109. The MS is then deregisters from the network using POWER-OFF-REGISTRATION [B-MIN,B-ESN] 110. The ISM cancels the registration with REGCANC [B-MSID, B-ESN] 111 and receives acknowledgement from the network with regcanc [B-MSID, B-ESN] 112 so other MSs may use B-MSID. The BS/MSC/VLR, initiate a global challenge with an OMT [AUTH=1, RAND] 113 to the MS which computes the authorization, in this case using a CAVE algorithm to compute AUTHR using AUTHR=CAVE (MSID, ESN, SSDA, SSDB) 114 and sends a REGISTRATION REQUEST [MSID, ESN, RANDC, AUTHR] 115 to the network at this point registration continues as a regular registration 116.

In FIG. 4, a Bootstrap Process is commenced by MS generating B-IMSI=GenerateBootstrapMSID(SiwaID) 120 and sending LocationUpdateReq [B-IMSI] 121 which is forwarded by the network to the ISM as SendAuthInfoReq [B-IMSI] 122. ISM generate RAND, compute a bootstrap signature using SRES=sign-1 (B-IMSI, RAND, BootstrapKey) 123, generate a bootstrap ciphering key using Kc=GenerateCipheringKey(B-IMSI, RAND, BootstrapKey) 123 and sends this information using SendAuthInfRes [B-IMSI,RAND,Kc,SRES] 124 to VLR. The VLR sends AuthenticateReq [B-IMSI,RAND] 125 to the MS. The MS generates an authentication signature using SRES=sign-1 (B-IMSI, RAND, BootstrapKey) 126, generate bootstrap ciphering key using Kc=GenerateCipheringKey(B-IMSI, RAND, BootstrapKey) 126 and sends authentication result using AuthenticateRes [B-IMSI,SRES] 127 which is then matched by the VLR to SRES provided by ISM 128. An UpdateLocationReq [B-IMSI] 129 is sent to the ISM by VLR. ISM allocates a temporary phone number T-MSISDN 130 and responds by downloading the subscriber's bootstrap profile to VLR using InsertSubscriberDataReq [B-IMSI, T-MSISDN] 131. VLR responds with InsertSubscriberDataRes [B-IMSI, T-MSISDN] 132. ISM sends UpdateLocationRes [B-IMSI] 133 to confirm the registration, which is forwarded to MS by the network using LocationUpdateRes [TMSI, SUCCESS] 134. At this point, an optional data connection establishment phase 135, either network originated or MS originated, may be executed. For SMS such a connection establishment is not required. ISM sends a message to MS including its own address, an authentication challenge and optionally include a PUBLIC KEY for encryption and ServerCertificate for ISM authentication using [addr=ADDR,ch=CHALLENGEMS+[encrypt=PUBLICKEY|ServerCertificate]] 136. MS may optionally check the ServerCertificate, compute a response using RESPONSEMS=sign-2 (SiwaID, CHALLENGEMS, SiwaKey) 137. Optionally, the MS may generate a network challenge to authenticate ISM. The MS may choose to encrypt the message sent to ISM with ISM PUBLICKEY. It then, sends the message using [encrypt(siwaid=SiwaID, res=RESPONSEMS,me=IMEI,ch=CHALLENGENET, PUBLICKEY)] 138. The ISM verifies SiwaID, verifies IMEI and checks MS signature using RESPONSEMS=sign-2 (SiwaID, CHALLENGEMS, SiwaKey) 139. It generate a network signature using RESPONSENET=sign-3 (SiwaID, CHALLENGENET, SiwaKey) 139. It then allocates new MSID (i.e. IMSI) and MSISDN 139. In cases where B-IMSI is an already pre-assigned unique identifier ISM may return B-IMSI back to MS as the allocated IMSI. It generates a RAND 139 used to derive session keys and sends a message to MS using [encrypt(msid=MSID,number=MSISDN,rand=RAND, res=RESPONSENET,SiwaKey)] 140. The MS verifies RESPONSENET=sign-2 (SiwaID, CHALLENGENET, SiwaKey) 141, saves IMSI and MSISDN. MS may optionally generate session key using Ki=GenerateSessionKey (IMSI, IMEI, MSISDN, RAND, SiwaID SiwaKey) 141. This key derivation could be avoided in cases where such a key is pre-assigned. It computes a SIGNATURE=Sign-4 (IMSI, IMEI, RAND, SiwaKey) 141 and sends a message to ISM [encrypt(siwaid=SiwaID,sign=SIGNATURE, SiwaKey)] 142. The ISM checks SIGNATURE=Sign-4 (IMSI, IMEI, RAND, SiwaKey) 143 and optionally generate session key using Ki=GenerateSessionKey(IMSI, IMEI, MSISDN, RAND, SiwaID SiwaKey) 143. At this point, if a data connection has been previously established it may be torn down 144. The MS is then deregisters from the network using IMSI DETACH [B-IMSI] 145, which is acknowledged by VLR using IMSI Detach Res [B-IMSI] 146. The ISM cancels the VLR bootstrap registration with CancelLocationReq [B-IMSI] 147 and receives acknowledgement from the network with CancelLocationRes [B-IMSI] 148 so other MSs may use B-IMSI. The MS initiate a registration with its new IMSI using LocationUpdatereq [IMSI] 149 to the network at this point registration continues as a regular registration 150.

In FIG. 5, a Bootstrap Process is commenced by MS generating B-IMSI=GenerateBootstrapMSID(NULL) 160 and sending LocationUpdateReq [B-IMSI] 161 which is forwarded by the network to the ISM as SendAuthInfoReq [B-IMSI] 162. ISM generate RAND, compute a bootstrap signature using SRES=sign-1 (B-IMSI, RAND, BootstrapKey) 163, generate a bootstrap ciphering key using Kc=GenerateCipheringKey(B-IMSI, RAND, BootstrapKey) 163 and sends this information using SendAuthInfRes [B-IMSI,RAND,Kc,SRES] 164 to VLR. The VLR sends AuthenticateReq [B-IMSI,RAND] 165 to the MS. The MS generates an authentication signature using SRES=sign-1 (B-IMSI, RAND, BootstrapKey) 166, generate bootstrap ciphering key using Kc=GenerateCipheringKey(B-IMSI, RAND, BootstrapKey) 166 and sends authentication result using AuthenticateRes [B-IMSI,SRES] 167 which is then matched by the VLR to SRES provided by ISM 168. An UpdateLocationReq [B-IMSI] 169 is sent to the ISM by VLR. ISM allocates a temporary phone number T-MSISDN 170 and responds by downloading the subscriber's bootstrap profile to VLR using InsertSubscriberDataReq [B-IMSI, T-MSISDN] 171. VLR responds with InsertSubscriberDataRes [B-IMSI, T-MSISDN] 172. ISM sends UpdateLocationRes [B-IMSI] 173 to confirm the registration, which is forwarded to MS by the network using LocationUpdateRes [TMSI, SUCCESS] 174. At this point, an optional data connection establishment phase 175, either network originated or MS originated, may be executed. For SMS such a connection establishment is not required. ISM sends a message to MS including its own address, an authentication challenge and optionally include a PUBLIC KEY for encryption and ServerCertificate for ISM authentication using [addr=ADDR,ch=CHALLENGEMS+ [encrypt=PUBLICKEY|ServerCertificate]] 176. MS may optionally check the ServerCertificate, select a purchase session encryption key PURCHASE 177, this could be pre-assigned or using known PKI technique. The MS may choose to encrypt the message sent to ISM with ISM PUBLICKEY. It then, sends the message using [encrypt (siwaid=NULL,res=NULL,me=IMEI, encrypt=PURCHASEKEY,PUBLICKEY)] 178. At Session Purchase Phase 180, ISM and MS start message exchange to promote a session purchase and to collect user's selection and billing information and commit an online purchase transaction. Such a transaction can include credit authorization that may be required for postpaid subscribers. Once purchase transaction has been authorized ISM allocates new SiwaID and generates an associated SiwaKey 181. It then allocates new MSID (i.e. IMSI) and MSISDN 181. In cases where B-IMSI is an already pre-assigned unique identifier ISM may return B-IMSI back to MS as the allocated IMSI. ISM generates a RAND 181 used to derive session keys and sends a message to MS using [encrypt(siwaID=SiwaID, siwakey=SiwaKey,msid=IMSI,number=MSISDN, rand=RAND,PURCHASEKEY)] 182. The MS saves newly assigned SiwaID, SiwaKey, IMSI and MSISDN. MS may optionally generate session key using Ki=GenerateSessionKey(IMSI, IMEI, MSISDN, RAND, SiwaID SiwaKey) 183. This key derivation could be avoided in cases where such a key is pre-assigned. It computes a SIGNATURE=sign-2 (IMSI, IMEI, RAND, SiwaKey) 183 and sends a message to ISM [encrypt(siwaid=SiwaID, sign=SIGNATURE, SiwaKey)] 184. The ISM checks SIGNATURE=sign-2 (IMSI, IMEI, RAND, SiwaKey) 185 and optionally generate session key using Ki=GenerateSessionKey(IMSI, IMEI, MSISDN, RAND, SiwaID SiwaKey) 185. At this point, if a data connection has been previously established it may be torn down 186. The MS is then deregisters from the network using IMSI DETACH [B-IMSI] 187, which is acknowledged by VLR using IMSI Detach Res [B-IMSI] 188. The ISM cancels the VLR bootstrap registration with CancelLocationReq [B-IMSI] 189 and receives acknowledgement from the network with CancelLocationRes [B-IMSI] 190 so other MSs may use B-IMSI. The MS initiate a registration with its new IMSI using LocationUpdateReq [IMSI] 191 to the network at this point registration continues as a regular registration 192.

In FIG. 6, bootstrap information is generated at the MS using B-MSID=GenerateBootstrapMSID B-ESN=GenerateBootstrapESN (NULL) 200 and the network responds OMT [AUTH=1, RAND] 201. The MS computes AUTHR=sign-1 (B-MSID, NULL, RAND, NULL) 202 and sends a REGISTRATION REQUEST [B-MSID, B-ESN, RANDC, AUTHR] 203 which is forwarded by the network to the ISM with AUTHREQ [B-MSID, B-ESN, RAND, AUTHR] 204. ISM optionally compute and check AUTHR=sign-1 (B-MSID, NULL, RAND, NULL) 205 and sends authreq [B-MSID, B-ESN, success] 206 to BS/MSC/VLR. BS/MSC/VLR then, respond with REGNOT [B-MSID, B-ESN] 207 to the ISM. ISM downloads the MS profile information with regnot [B-MSID, B-ESN, profile] 208 and REGISTRATION ACCEPT [B-MSID, B-ESN] 209 is forwarded to the MS. At this point, an optional data connection establishment phase 210, either network originated or MS originated, may be executed. For SMS such a connection establishment is not required. ISM sends a message to MS including its own address, an authentication challenge and optionally include a PUBLIC KEY for encryption and ServerCertificate for ISM authentication using [addr=ADDR, ch=CHALLENGEMS+ [encrypt=PUBLICKEY|ServerCertificate]] 211. MS may optionally check the ServerCertificate, select a purchase session encryption key PURCHASE 212, this could be pre-assigned or using known PKI technique. The MS may choose to encrypt the message sent to ISM with ISM PUBLICKEY. It then, sends the message using [encrypt (siwaid=NULL,res=NULL,me=ESN, encrypt=PURCHASEKEY,PUBLICKEY)] 213. At Session Purchase Phase 215, ISM and MS start message exchange to promote a session purchase and to collect user's selection and billing information and commit an online purchase transaction. Such a transaction can include credit authorization that may be required for postpaid subscribers. Once purchase transaction has been authorized ISM allocates new SiwaID and generates an associated SiwaKey 216. It then allocates new MSID (i.e. MIN or IMSI) and MDN 216. ISM generates a RAND 216 used to derive session keys and sends a message to MS using [encrypt(siwaID=SiwaID, siwakey=SiwaKey,msid=MSID,number=MDN, rand=RAND,PURCHASEKEY)] 217. The MS saves newly assigned SiwaID, SiwaKey, MSID and MDN. MS may derives session keys using [Akey,SSDA,SSDB]=GenerateSessionKey (MSID,ESN,MDN,RAND,SiwaID, SiwaKey) 218. It computes a SIGNATURE=sign-2 (MSID, ESN, RAND, SiwaKey) 218 and sends a message to ISM [encrypt (siwaid=SiwaID,sign=SIGNATURE, SiwaKey)] 219. The ISM checks SIGNATURE=sign-2 (MSID, ESN, RAND, SiwaKey) 220 and derive session keys using [Akey,SSDA, SSDB]=GenerateSessionKey (MSID,ESN,MDN,RAND,SiwaID, SiwaKey). At this point, if a data connection has been previously established it may be torn down 221. The MS is then deregisters from the network using POWER-OFF-REGISTRATION [B-MIN,B-ESN] 222. The ISM cancels the registration with REGCANC [B-MSID, B-ESN] 223 and receives acknowledgement from the network with regcanc [B-MSID, B-ESN] 224 so other MSs may use B-MSID. The BS/MSC/VLR, initiate a global challenge with an OMT [AUTH=1, RAND] 225 to the MS which computes the authorization, in this case using a CAVE algorithm to compute AUTHR using AUTHR=CAVE (MSID, ESN, SSDA, SSDB) 226 and sends a REGISTRATION REQUEST [MSID, ESN, RANDC, AUTHR] 227 to the network at this point registration continues as a regular registration 228.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A secure immediate access wireless apparatus that enables at least one non-active wireless device to activate itself on the wireless network comprising:
   an intelligent service manager server managing an activation session of said at least one non-active wireless device;
   means for said non-active wireless device to generate at least one temporary mandatory network identifier from a set of allocated network identifiers at the beginning of activation to gain access to said intelligent service manager server via said wireless network;
   wherein the set of allocated network identifiers provide access only to said intelligent service manager server only via said wireless network;
   wherein generation of said at least one temporary network identifier at the beginning of the process is algorithmically generated;
   means for securely exchanging information between said at least one non-active wireless device and said intelligent service manager server during said activation session, wherein wireless network elements interposed between said intelligent service manager server and said wireless device passively route messages between said intelligent service manager server and wireless device as if said wireless device were active;
   means for utilizing one or more wireless messaging transports to exchange information between said at least one non-active wireless device and said intelligent service manager server during activation without requiring either implementation of extensions to messaging protocols or changes to network elements supporting said messaging protocols;
   wherein activation comprises the steps of:
      said non-active device detecting that it is not active generating at least one temporary mandatory network identifier from a set of allocated temporary network identifiers;
      said non-active device gaining access to said wireless network using said at least one temporary network identifier generated by said wireless device;
      said intelligent service manager server returning a profile for said non-active wireless device to appropriate network elements;
      said non-active wireless device authenticating said intelligent service manager server;
      said intelligent service manager server authenticating said non-active wireless device;
      said intelligent service manager server allocating mandatory network identifiers for said non-active wireless device;
   wherein activation further comprises any of the steps of:
      said intelligent service manager server programming said non-active wireress device with mandatory network identifiers and security key;
      said intelligent service manager server interacting with a user via said wireless device immediately after authentication;
      said intelligent service manager server triggering an additional network provisioning process; and
      said intelligent service manager server providing feedback to said user.

2. The apparatus of claim 1, wherein said intelligent service manager server denies access to said wireless network from unauthorized wireless devices.

3. The apparatus of claim 1, wherein said intelligent service manager server denies access to said wireless network from unauthorized, non-provisioned, and non-activated wireless devices on a session basis.

4. The apparatus of claim 1, wherein said intelligent service manager server provides said non-activated wireless device with either of limited and unlimited access to said wireless network after activation.

5. The apparatus of claim 4, wherein said intelligent service manager server provides said non-activated wireless device with limited use access to said wireless network.

6. The apparatus of claim 4, wherein said intelligent service manager server provides said non-activated wireless device with limited time access to said wireless network.

7. The apparatus of claim 4, wherein said intelligent service manager server provides said non-activated wireless device with limited duration access to said wireless network.

8. The apparatus of claim 1, said intelligent service manager server further comprising:
   means for allocating a network identification number to said non-activated wireless device on a per network access basis.

9. The apparatus of claim 8, said intelligent service manager server further comprising:
   means for allocating network authentication and encryption keys associated with said network identification number to said non-activated wireless device on a per network access basis.

10. The apparatus of claim 9, wherein said authentication and encryption keys comprises any of a KI for the GSM protocol, [A-Key, SSD-A, SSD-B] for the CDMA, TDMA and analog protocols.

11. The apparatus of claim 8, said intelligent service manager server further comprising:
 means for allocating a phone number to said non-activated wireless device on a per network access basis.

12. The apparatus of claim 11, wherein said phone number comprises any of a MSISDN for the GSM protocol, MIN or MDN for the CDMA, TDMA and analog protocols.

13. The apparatus of claim 8, wherein said network identification number comprises any of an IMSI for the GSM protocol, MIN for the TDMA and analog protocols, and MIN or IMSI for CDMA protocol.

14. The apparatus of claim 1, said means for using existing wireless network messaging transports comprising:
 a secure immediate wireless access abstraction layer that employs a Wireless Session said to provide said wireless device with either of a limited or unlimited proof to use a particular service.

15. The apparatus of claim 14, wherein limited proof enables any of time based use, usage based use, content based use, or single use.

16. The apparatus of claim 14, wherein said Wireless Session comprises:
 a <SiwaID, SiwaKey> pair which uniquely identifies said Wireless Session and proves it is authentic, genuine, and valid, said wireless session, said wireless session further comprising a subscription denoted by said pair providing one of limited and unlimited access.

17. The apparatus of claim 16, wherein said SiwaID is unique among services and identifies those services with which it is associated.

18. The apparatus of claim 16, further comprising:
 a bootstrap mechanism for acquiring a Wireless Session.

19. The apparatus of claim 16, further comprising:
 a bootstrap mechanism for provision and activation of a Wireless Session.

20. The apparatus of claim 16, wherein any of the following operations are associated with session purchase at first network access:
 SessionPromote, which comprises an operation invoked by said intelligent service manager to provide said user with an option to purchase a Wireless Session for a service;
 SessionPurchase, which comprises an operation invoked by said user and/or said wireless device to purchase a Wireless Session for a service;
 SessionGranted, which comprises an operation invoked by said intelligent service manager to provide said user with a <SiwaID, Siwakey> pair; and
 SessionDenied, which comprises an operation invoked by said intelligent service manager to provide said user with a reason for a purchase failure.

21. The apparatus of claim 16, wherein any of the following operations are associated with Wireless Session access:
 SessionChallenge, which comprises an operation invoked by said intelligent service manager to ask for authenticity of a SiwaID;
 SessionProof, which comprises an operation invoked by said user and/or said wireless device to provide said intelligent service manager with a proof of SiwaID authenticity;
 SessionApproved, which comprises an operation invoked by said intelligent service manager to approve said user and/or said wireless device for use of a service;
 SessionExpired, which comprises an operation invoked by said intelligent service manager to deny service due to Wireless Session expiration;
 SessionDepleted, which comprises an operation invoked by said intelligent service manager to deny services due to Wireless Session depletion; and
 SessionFraudulent which comprises an operation invoked by said intelligent service manager to deny services due to lack of authenticity of Wireless Session.

22. The apparatus of claim 16, wherein any of the following operations are associated with certificate information:
 SessionProvideInfo, which comprises an operation invoked by said user and/or said wireless device to provide Wireless Session information, which may include expiration or usage; and
 SessionInfo, which comprises an operation invoked by said intelligent service manager to provide said user and/or said wireless device with Wireless Session information, which may also be unsolicited.

23. The apparatus of claim 1, said means for using existing wireless network messaging comprising:
 an adaptation layer for effecting mapping of logical operations into an existing wireless network.

* * * * *